United States Patent
Perriello et al.

(10) Patent No.: US 10,997,643 B2
(45) Date of Patent: May 4, 2021

(54) REAL ESTATE OFFER MANAGEMENT SYSTEM

(71) Applicant: Realogy Holdings Corp., Madison, NJ (US)

(72) Inventors: Alex Perriello, Mt. Arlington, NJ (US); John Canniffe, New Providence, NJ (US)

(73) Assignee: Realogy Holdings Corp., Madison, NJ (US)

( * ) Notice: Subject to any disclaimer, the term of this patent is extended or adjusted under 35 U.S.C. 154(b) by 1105 days.

(21) Appl. No.: 14/847,948

(22) Filed: Sep. 8, 2015

(65) Prior Publication Data

US 2016/0071178 A1    Mar. 10, 2016

Related U.S. Application Data

(60) Provisional application No. 62/046,646, filed on Sep. 5, 2014.

(51) Int. Cl.
*G06Q 30/00*    (2012.01)
*G06Q 30/06*    (2012.01)
*G06Q 50/16*    (2012.01)

(52) U.S. Cl.
CPC ......... *G06Q 30/0611* (2013.01); *G06Q 50/16* (2013.01)

(58) Field of Classification Search
None
See application file for complete search history.

(56) References Cited

U.S. PATENT DOCUMENTS

| | | | |
|---|---|---|---|
| 6,684,196 B1 | 1/2004 | Mini et al. | |
| 7,546,268 B1* | 6/2009 | DiGiovanni | G06Q 40/00 705/35 |
| 9,569,797 B1* | 2/2017 | Rohn | G06Q 40/025 |
| 2002/0105532 A1* | 8/2002 | Oblinger | G06Q 30/02 715/701 |
| 2005/0154656 A1* | 7/2005 | Kim | G06Q 10/02 705/30 |

(Continued)

FOREIGN PATENT DOCUMENTS

AU    2006236066 A1    12/2006

OTHER PUBLICATIONS

EBrokerHouse; "eBrokerHouse Overview"; Jun. 28, 2013. NOTE: this is a video demonstrating real estate software. The times in the Office Action refer to the time reference point of the video. The video can be found at https://www.youtube.com/watch?v=IQQ2ghtFktg (Year: 2013).*

(Continued)

*Primary Examiner* — Naeem U Haq
*Assistant Examiner* — Norman Donald Sutch, Jr.
(74) *Attorney, Agent, or Firm* — Murtha Cullina LLP

(57) ABSTRACT

A real estate offer management system includes a server in electronic communication with a user computer over the Internet. A user interface is provided by the server and includes a webpage for receiving seller preferences from the user computer. The seller preferences relate to a plurality of offer components for the sale of a property. An offer scorer receives a plurality of offers concerning the property and calculates scores for each offer using the seller preferences.

19 Claims, 8 Drawing Sheets

(56) References Cited

U.S. PATENT DOCUMENTS

2008/0300995 A1* 12/2008 Smejkalova ....... G06Q 30/0611
                                              705/7.32
2014/0236751 A1*  8/2014 Bloomfield ........ G06Q 30/0601
                                              705/26.3
2015/0317709 A1* 11/2015 Zimmerman .......... G06Q 30/08
                                              705/80

OTHER PUBLICATIONS

Rebecca Schuman; "Finally, a Website That Uses Math to Make Your Difficult Decisions For You"; Apr. 30, 2014; slate.com (Year: 2014).*

Business Editors/High-Tech Writers; "Vectiv to Launch First Comprehensive Real Estate ASP for Strategic Real EstateDecision Makers; Convergence Partners, campsix and Andersen Consulting Teamwith Newly Formed Company"; Jul. 24, 2000; Business Wire (Year: 2000).*

* cited by examiner

Make an Offer
702

Welcome to Offer Pro, Bill!
(if you are not Bill, click here)

706

| Details & Documents | Review/Submit Your Offer |

704

708 — Listing Image | 7 Smith Street
Town, State
MLS #12345

Offer Deadline

| Aug 28 | 7 days | 11:27 hrs min |

Other Activity on this Property

Number of Offers to Date: 4

From these Brokerages:
  ABC Brokers (2)
  123 Brokers (2)

Most Recent Bid: 08-19-2015

Listing Agent

Agent Image | Name
Phone
Address
Brokerage

712 — Seller Requirements

LIST PRICE
$600,000

714 — Your Offer Details

720:
- Offer Amount: ____
- Cash Down: ____
- Earnest Money: ____
- Mortgage? ○ Yes  ○ No (all cash)
- Desired Closing Date: ____
- Offer Expiration Date: ____
- Buyer's Name: ____
- Contingencies:
  ○ Financing      ○ Appraisal
  ○ Inspection     ○ Sale of Home
  ○ Lead Paint Test ○ Radon Test
  ○ Mold Inspection ○ Sewer Inspection
  ○ Other (specify): ____

[Upload Documents]

FIG. 7

Make an Offer

[Details & Documents] | [Review/Submit Your Offer]

[Listing Image] 7 Smith Street
Town, State
MLS #12345

Seller Requirements

LIST PRICE
$600,000

Your Offer Details

| | |
|---|---|
| Offer Amount: | $550,000 |
| Cash Down: | $110,000 |
| Earnest Money: | $1,000 |
| Mortgage? | ●Yes  ○No (all cash) |
| Desired Closing Date: | 10/1 |
| Offer Expiration Date: | 8/28 |
| Buyer's Name: | John Royal |

Contingencies:
● Financing   ● Appraisal
○ Inspection   ● Sale of Home
○ Lead Paint Test   ○ Radon Test
○ Mold Inspection   ○ Sewer Inspection
○ Other (specify): ____

[Upload Documents]

If you increase you offer to 90% of asking, it is 3x more likely to be accepted.

This buyer prefers a closing date of 9/26 or earlier.

Offers with Sale of Home contingencies are accepted only 40% of the time in this geographic area.

FIG. 8

REAL ESTATE OFFER MANAGEMENT SYSTEM

FIELD OF THE INVENTION

The present teachings relate generally to systems and methods for managing offers to purchase goods and services and, more particularly, to comparing offers for real estate according to a seller's preferences.

BACKGROUND OF THE INVENTION

Real estate offer management systems are known. They comprise computer hardware/software having a graphical user interface (GUI) that allows potential buyers to submit their offers. An offer management system acts as an intermediary to collect various offers from potential buyers so that a seller/listing agent has a centralized place to view them.

However, known systems lack the ability to effectively compare the offers received. Therefore, it would be beneficial to have a superior real estate offer management system.

SUMMARY OF THE INVENTION

The needs set forth herein as well as further and other needs and advantages are addressed by the present embodiments, which illustrate solutions and advantages described below.

The system of the present embodiment includes, but is not limited to, a server in electronic communication with a user computer over the Internet, a user interface provided by the server, the user interface comprising a webpage and receiving seller preferences from the user computer, the seller preferences relating to a plurality of offer components for the sale of a property, and an offer scorer receiving a plurality of offers concerning the property and calculating scores for each offer using the seller preferences.

Other embodiments are described in detail below and are also part of the present teachings.

For a better understanding of the present embodiments, together with other and further aspects thereof, reference is made to the accompanying drawing and detailed description.

BRIEF DESCRIPTION OF THE DRAWINGS

FIG. 7 is user interface generated by the system according to the present teachings.

FIG. 8 is user interface generated by the system according to the present teachings.

DETAILED DESCRIPTION OF THE INVENTION

Figure 1:
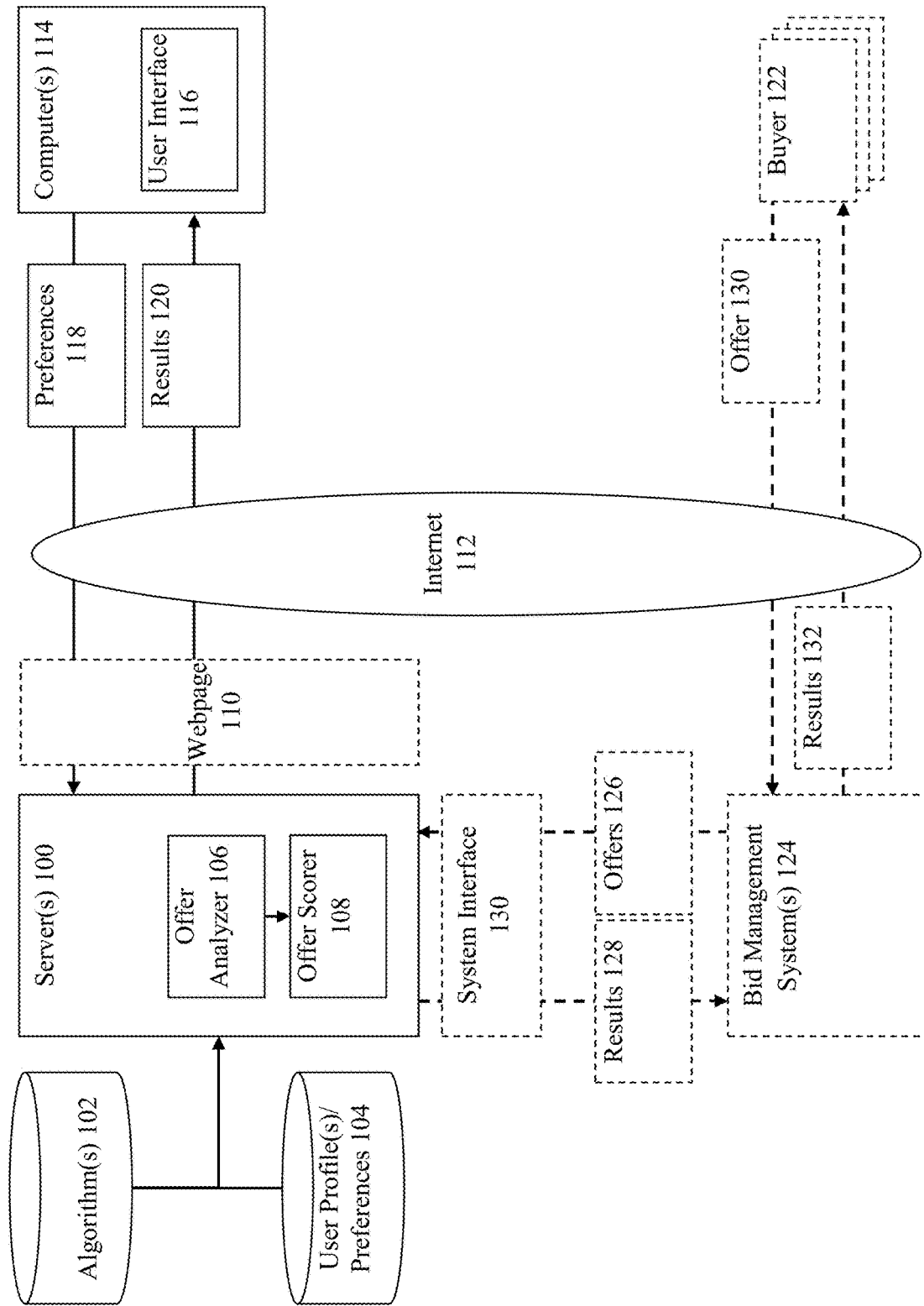
FIG. 1 is a diagram of one embodiment of the system according to the present teachings.

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

Known real estate offer management systems comprise computer hardware and software that provide for a graphical user interface for potential buyers to submit offers (e.g., bids) on real estate property. Sellers and/or listing agents typically use a real estate offer management system as a centralized place to store and view offers. In practice, a seller/listing agent notifies potential buyers/agents that all offers are to be submitted using the offer management system and the offers are submitted to that system so the seller/listing agent can view them.

Known real estate offer management systems lack the ability to provide useful information that can be used by listing agents to compare offers. For example, prior art systems do not score each offer so that they each have a quantifiable (and standardized) score. Prior art systems are only concerned with the administration of managing the receipt and storage of offers. Getting the information organized in such a system may be helpful, but fails to provide a useful system for comparing offers.

One objective of the present teachings is to provide users (e.g., real estate agents, buyers/sellers, etc.) with actionable intelligence about their offers in the form of a numeric score. In this way, the present teachings assist agents in comparing, contrasting and assessing multiple offers on the same property in way that does currently not exist. By allowing an agent to set the scoring criteria for each of their listings based on the customer's specific need (e.g., price, time to close, risk factors, etc.), such a system may become a valuable tool that provides agents with actionable intelligence. This intelligence may be shared with their seller when the seller is trying to select one offer among many.

Accordingly, one way to improve the current process for managing real estate offers is to create a system that a listing agent can use to customize offer criteria to meet the needs of a seller and present the information in a unique way. In one embodiment, the present teachings provide detailed criteria on each offer as they relate to other offers under consideration. These criteria can then be calculated into an offer score, which may be relative to the other offers received. Such a system is not known in the prior art.

In one embodiment, the present teachings may be integrated into commercial offer management software so that buyers (or buyer agents, etc.) may submit their offers. In an alternative embodiment, the system may receive information from commercial offer management software such as OfferPro™, which is a product provided by the assignee of the present application. In this way, a system according to the present teachings can retrofit existing systems and provide this functionality by exchanging data with them.

A score may be created from the seller's preferred criteria for each offer. The scores may be provided to the agents involved in the transaction, who can use that intelligence to inform their clients. Buyer's agents may also receive a score that is calculated based on how the details of their buyer's offer match with the preferences of the seller or how their offer compares relative to other offers that have been submitted. For example, buyer's agent A may make an offer that matches all the criteria set forth by the seller while buyer's agent B may make an offer that matches only one criterion (e.g., closing date) of the seller. Buyer's agent A's offer matches the seller's preferences better than buyer's agent B's offer. Thus, buyer's agent A would receive a higher score than buyer's agent B. Relative to each other, buyer's agent A's offer is better than buyer's agent B's offer.

Agents often complain that their offers are not submitted properly to sellers and that offers are misunderstood by listing agents due to the multiple ways in which they are received (e.g., phone calls, texts, emails, etc.). The present teachings provide a platform so offers can be entered, normalized, and then compared, although not limited thereto. Scoring provides a quantifiable numeric component for that comparison. In this way, the present teachings may answer the question: Which of these offers is best for my client at this time, given their unique set of circumstances?

The score may be derived by analyzing any number of components of each offer (e.g., offer price, closing date, etc.) and giving each offer a score based on how closely the offer matches the seller's criterion. In many cases, the highest price is the primary objective, but in other cases the closing date, riskiness of the offer, or other factors (e.g., a relocation situation or a contingency to sell this house in order to buy another one, someone financing 90% of the home and financing falls through, etc.) could be the most important to a seller. The scoring criteria may be customized based on the specific needs of the seller. These scores may help the listing agent find the right offer for the customer given the customer's specific need.

Shown below are exemplary offer components (e.g., price, contingencies, etc.) for a seller as well as the seller's preferences (e.g., weights assigned to each):

|  | Weights | Seller criteria |
|---|---|---|
| List Price | 50% | $600,000 |
| Earnest Money | 2% | $1,000 |
| Down Payment % | 0% |  |
| Down Payment | 0% | $120,000 |
| Mortgage amount | 0% | $479,000 |
| Closing Date | 8% | Sep. 15, 2014 |
| Other Contingencies | 25% | 0 |
| Home Sale Contingency | 5% | No |
| Mortgage Approval | 5% | Yes |
| All Cash | 5% | No pref. |
| Total: | 100% |  |

The components may include offer price, earnest money deposit, mortgage approval letter, closing date target, home sale contingency, and other contingencies (inspection, etc.), although not limited thereto. The components may all be used as inputs to determine a score by giving them a weighting. The weights can be customized (e.g., by the listing agent according to the seller's preferences) using a user interface (e.g., webpage, smartphone app, etc.). In the example shown above, for example, higher "listing price" and "earnest money" may increase the score, while "down payment %", "down payment", and "mortgage amount" may have no effect. The closer the proposed closing date is to the desired "closing date" may also result in a higher score.

In one embodiment, the components may be given default values that can be configured by the listing agent so scores are personalized to each seller's specific circumstances. For example, the listing agent may provide templates of default values based on the seller (e.g., type of property, motivated seller, geographic region, etc.), although not limited thereto.

A seller may receive any number of offers, as shown below:

|  | Offer 1 | Offer 2 | Offer 3 | Offer 4 | Offer 5 |
|---|---|---|---|---|---|
| Offer Price | $590,000 | $600,000 | $610,000 | $598,000 | $605,000 |
| Earnest Money | $1,000 | $1,000 | $1,000 | $1,000 | $1,000 |
| Down Payment % | 20% | 15% | 20% | 20% | 25% |
| Down Payment | $118,000 | $90,000 | $122,000 | $119,600 | $604,000 |
| Mortgage amount | $471,000 | $509,000 | $487,000 | $477,400 | $0 |
| Closing Date | Oct. 15, 2014 | Sep. 30, 2014 | Oct. 1, 2014 | Oct. 1, 2014 | Oct. 1, 2014 |
| Other Contingencies | 0 | 1 | 0 | 1 | 1 |
| Home Sale Contingency | 1 | 1 | 1 | 1 | 1 |
| Mortgage Approval | 1 | 1 | 1 | 1 | 1 |
| All Cash | 0 | 1 | 0 | 0 | 1 |

The offers may then be scored according to the seller's preferences as shown below:

|  | Offer 1 Score | Offer 2 Score | Offer 3 Score | Offer 4 Score | Offer 5 Score |
| --- | --- | --- | --- | --- | --- |
| Offer Price | 0.4917 | 0.5000 | 0.5083 | 0.4983 | 0.5042 |
| Earnest Money | 0.0200 | 0.0200 | 0.0200 | 0.0200 | 0.0200 |
| Down Payment % | 0 | 0 | 0 | 0 | 0 |
| Down Payment | 0 | 0 | 0 | 0 | 0 |
| Mortgage amount | 0 | 0 | 0 | 0 | 0 |
| Closing Date | 0.0027 | 0.0053 | 0.0050 | 0.0050 | 0.0050 |
| Other Contingencies | 0.0000 | 0.2500 | 0.0000 | 0.2500 | 0.2500 |
| Home Sale Contingency | 0.0500 | 0.0500 | 0.0500 | 0.0500 | 0.0500 |
| Mortgage Approval | 0.0500 | 0.0500 | 0.0500 | 0.0500 | 0.0500 |
| All Cash | 0.0000 | 0.0500 | 0.0000 | 0.0000 | 0.0500 |
| Score | 0.6144 | 0.9253 | 0.6333 | 0.8733 | 0.9292 |

Scores may be calculated based on the seller's "weights." Using the example above, offers may be scored by giving the components "Other contingencies", "home sale contingencies", "mortgage approval", and "all cash" a 1 or a 0, although not limited thereto. For example, if an offer has no "other contingency" it may be scored a 1. Similarly, if a buyer has "mortgage approval" their offer is given a 1, since that may be ideal. They are then multiplied by the seller's weight to get a component score.

In the case of price, using Offer 1 as an example, the offer amount (e.g., $590,000) may be divided by the seller's listing price (e.g., $600,000) to get a value of 0.983. The 0.983 may then be multiplied by the seller's weight (e.g., 50%) get the component score of 0.4917. If you add all of the seller's weights they add up to 100% or 1.00. A score of 0.4917 means that of the 0.50 available points available for this component, this offer price received 0.4917 points or 98% of the possible 0.50 points.

The closing date may also be scored. In one embodiment, again using Offer 1 as an example, the difference in days between the seller's preferred closing date (e.g., Sep. 15, 2014) and the proposed closing date (e.g., Oct. 15, 2014) is 30 days. To calculate the score, 1 may be divided by the number of days (e.g., 30) and multiplied by the seller's weight (e.g., 8%) to get a score of 0.0027.

Described herein is one exemplary embodiment of scoring the various components and the present teachings are not limited thereto. What is desirable is to provide quantifiable differences between offers that agents receive on their listings. Depending on the customer's specific preferences, the customer can choose the offer that they believe to be the best one for them given their specific set of circumstances.

In the example shown above, Offer 3 has a contingency so the score comes in around 63 despite having the highest price. This offer may be accepted if in fact price is the most important criteria for the seller. Given the criteria set by the listing agent, however, Offer 5 has the highest score because it best matches the preferences of the seller.

The score can be used to compare each offer against other offers to aid in the decision making process. Buyer's agents may also get a score on offers they submitted, based on how closely their offer matches the preferences of the seller as well as how their offer compares with other offers on the property. In this way, the buyer's agent score may be relative to all of the other offers on the property and may change over time as additional offers are made.

After multiple offers are received on a listing, scores can be made relative to the highest score. In the example shown above, Offer 5 has the highest score (0.9292). Therefore Offer 1 may have a relative score of 66% (e.g., 0.6144 divided by 0.9292), indicating that Offer 1 scored 66% of the current highest offer. The relative score would change as new offers are entered, existing offers are updated, or the seller changes their criteria or weights used to calculate the score.

|  | Offer 1 Score | Offer 2 Score | Offer 3 Score | Offer 4 Score | Offer 5 Score |
| --- | --- | --- | --- | --- | --- |
| Score | 0.6144 | 0.9253 | 0.6333 | 0.8733 | 0.9292 |
| Relative Score | 66% | 99.6% | 68% | 94% | 100% |
| Score Rank | 5 | 2 | 4 | 3 | 1 |

The present teachings may also include a user interface that allows a seller/listing agent/etc. to dynamically change the relative weights of the components to compare offers. For example, the components may each have sliders or some other way to denote a weight given by the seller. As the seller moves the slider, e.g., from 20% weight to 80% weight, the scoring for the various offers may dynamically change. This allows the listing agent to dynamically alter the weightings used to calculate each score if a seller's particular set of circumstances change, and provides a unique and dynamic user interface for presenting offer information. As an example, a seller's desired closing date can change from the Fall or late September to before Thanksgiving or before 2015 because of tax purposes, relocation, etc.

In one embodiment, the present teachings provide for alerting the seller/listing agent/etc. when an offer is received that matches or exceeds a predetermined score. A seller may have a user profile that stores preferences as well as contact information, etc. Included in this profile may be criteria for alerting when an offer is received, or when offers are received that meet predetermined criteria (e.g., minimum score, minimum price, etc.), although not limited thereto.

In the case of the buyer's agent, the scoring may provide insight regarding how the buyer's offer rates relative to all other offers. Agents may use the scoring to determine the best offer for the customer given the customer's specific direction. In this way, the system may provide a relative ranking of the buyer's score so that the buyer can decide whether to make another offer.

Referring now to FIG. 1, shown is a diagram of one embodiment of the system according to the present teachings. The system may provide an offer management tool that enables listing agents to manage situations in which multiple offers are made on one of their listings. Such a platform allows users to invite buyer agents, set offer deadlines, terms and parameters, compare competing offers, and ultimately select the offer of their clients' choosing, although not limited thereto.

As shown in FIG. 1, a server (or servers) 100 has functional components of hardware and/or software executing on computer readable media. Discussed further below, components may include an offer analyzer 106 and offer scorer 108, although not limited thereto. Each of the offer analyzer 106 and offer scorer 108 may be a software module executing on the server 100 and/or an independent hardware element, such as a processor. The server 100 may be in electronic communication with user computer(s) 114 over a network such as the Internet 112. A user interface 116 may be provided to computer 114, which may include a webpage 110, although not limited thereto.

Using the user interface 116, a user may provide preferences 118 (e.g., weights and preferable sale components, etc.) that may be stored (e.g., as a seller's criteria model) in data store 104. Using such preferences the offer analyzer 106 and/or offer scorer 108 may apply algorithms from an algorithm data store 102 in order to generate results 120 (e.g., offer scores, etc.) for the user. The system may also store historical and real time information about other real estate transactions processed by the system (and/or received from third party source), in the databases 102/104 or an additional database, for use in determining default scores and providing dynamic feedback as discussed in more detail below.

The system may also exchange data with, or be embodied in, commercial offer management systems 124. In one embodiment, buyer(s) 122 may make offer(s) 130 using the offer management system 124. The offers 126 may then be transmitted to the server 100 using a system interface 130, although not limited thereto. The system interface 130 may provide for data interaction with any number of different commercial offer management systems, although not limited thereto. For example, it may allow for data exchange using XML or provide public application programming interfaces (APIs). Results 128, 132 may be returned to the offer management system and to the buyer so that the buyer 122 (e.g., buyer, agent, etc.) can evaluate the relative success of the offer.

The user interface may comprise a webpage and be accessible over the network to users located anywhere throughout the world. The webpage may be part of a secure website that requires username and password. Users may have permissions for accessing different functionality. For example, the listing agent may have permission to select the different components used for scoring, whereas the seller may only have permission to change weights, although not limited thereto. Buyer's agents may have permission to see information about the listing but only limited statistical information about offers. One skilled in the art would appreciate the different ways such a system could be implemented without diverging from the present teachings.

In use, an agent's listing may generate multiple offers. The listing agent may discuss with the seller preferable criteria (e.g., components) used to score offers. For example, for some sellers the price is most important, the closing date is second, risk is next, etc. The listing agent may configure the scoring criteria for that listing and invite interested agents to make an offer on the property (e.g., via a property-specific email invitation, etc.). Buyer's agents may then make offers. The system may normalize all of the offer information and send out scores to the listing agent and participating buyer's agents as each offer is entered.

Figure 2:
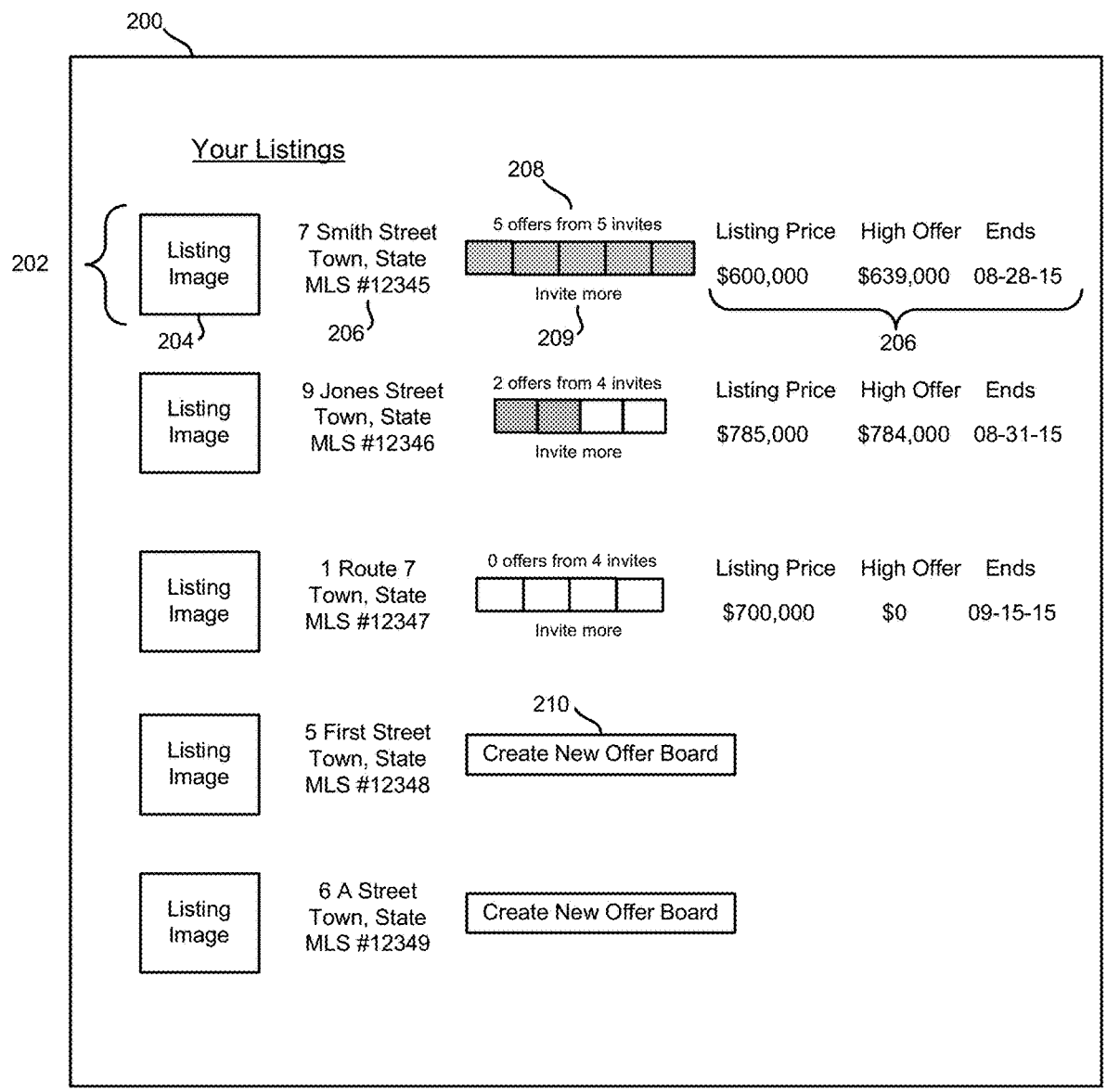
FIG. 2 is user interface generated by the system according to the present teachings.

The system may generate and display different user interfaces for the different individuals involved in the transaction. FIG. 2 illustrates a user interface 200 presented to a listing agent. The user interface 200 provides information on a plurality of listings 202 associated with the listing agent and the status of offers 208 for each listing. In one embodiment, the listing agent may create an Offer Board user interface to invite buyers or their agents to make offers by clicking a selectable icon 210. Once an Offer Board is created for a property, the listing agent may view the number of offers received and information 206 about the listing and Offer Board, including list price, highest offer to date, and end date of the Offer Board. The listing agent may also select an icon 209 to invite more potential buyers to the Offer Board.

Figure 3:
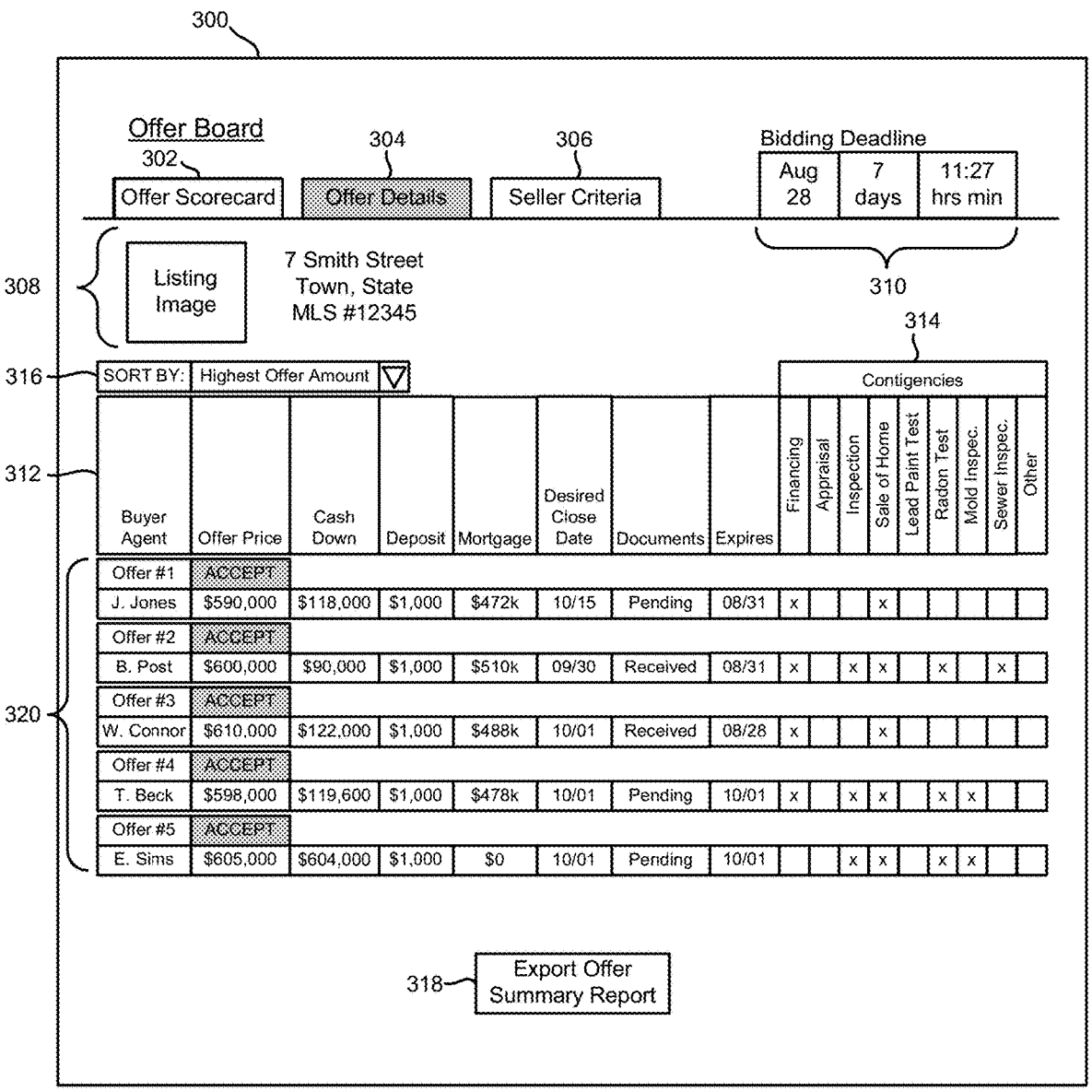
FIG. 3 is user interface generated by the system according to the present teachings.

FIG. 3 illustrates another user interface 300, or tab of the Offer Board user interface, in which the listing agent (or the seller) can view offers 320 that have been received for a particular listing 308. The information in this Offer Details tab 304 may be sorted 316 by any of the criteria 312 (including contingencies 314) associated with the offers. The listing agent or the seller may also accept any of the offers by selecting an Accept icon in the user interface 300, which sends a message indicating acceptance to the buyer or buyer's agent. The message may be in the form of an email or other electronic communication (e.g., text message), as an alert on the buyer's agent's user interface, or both.

Figure 4:
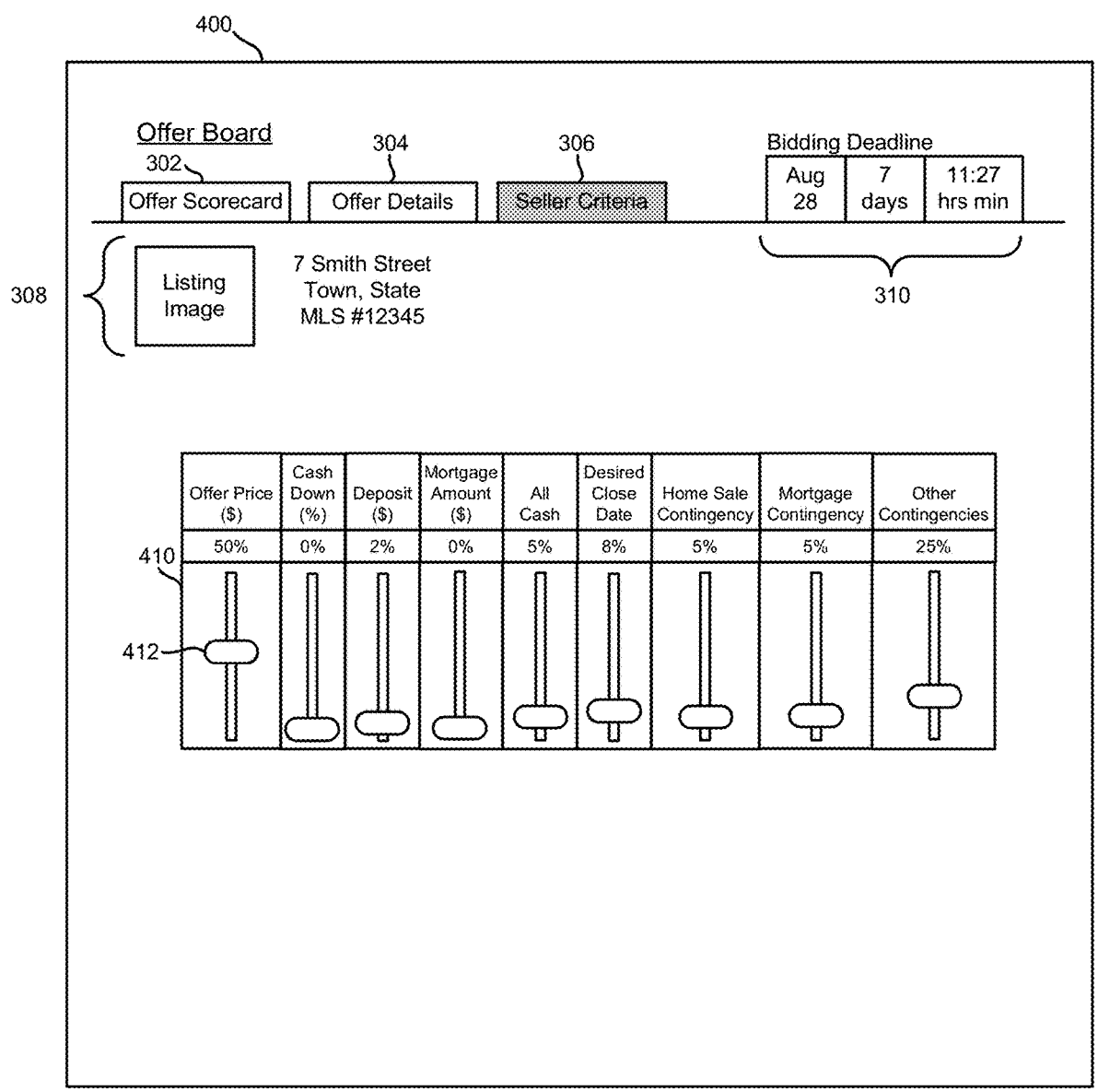
FIG. 4 is user interface generated by the system according to the present teachings.

FIG. 4 illustrates another user interface 400, or tab of the Offer Board user interface, in which the seller's criteria may be entered by the listing agent or directly by the seller. The user interface 400 includes a criteria module 410 with a plurality of selectors 412. In this example, the selectors 412 are vertical sliders for changing weights of the various criteria. As a user changes the percentage for one criteria, such as offer price, the system may dynamically increase or decrease the other criteria percentages proportionally to equal 100%. Alternatively, the system may instead issue an alert to the user via the user interface 400 to adjust the remaining criteria to equal 100% once one of the criteria is adjusted.

Figure 5:
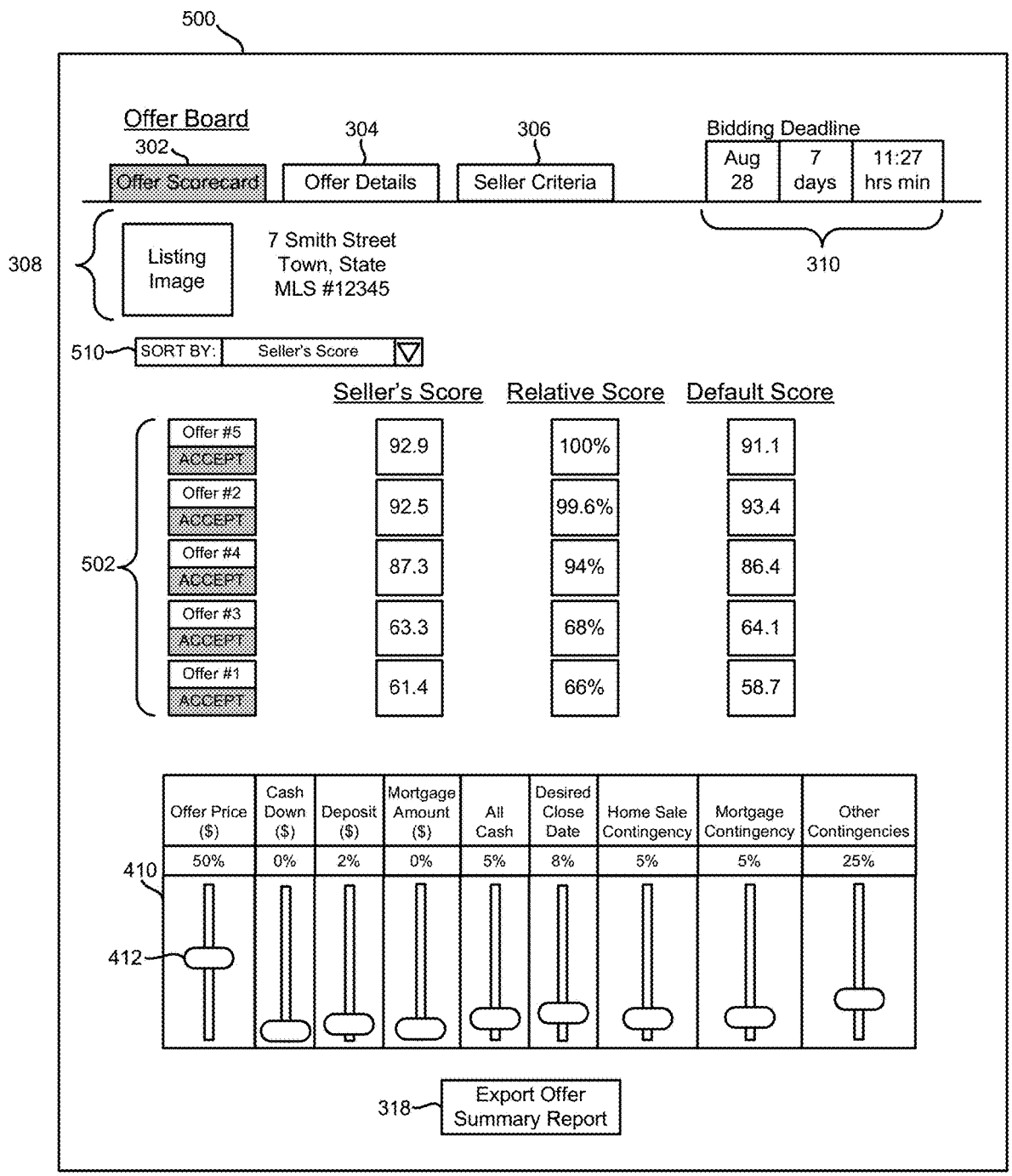
FIG. 5 is user interface generated by the system according to the present teachings.

FIG. 5 illustrates a user interface 500 presenting an Offer Scorecard to the listing agent or seller. Based on the criteria chosen by or on behalf of the seller, a seller's score and/or a relative score may be presented for each of the offers 502. In some embodiments, the user interface 500 may also display a default score calculated by the system. In particular, the system could learn over time from the other accepted offers which of the offer criteria is most desirable (e.g., nationally or in the particular geographical area or neighborhood). This could also come from feedback directly from the seller's agent and could be an ongoing input into the model (from the databases 102/104), although not limited thereto. As the system obtains more data (e.g., whether offers are accepted, etc.) and, as an example, offers that are all cash and have exact closing dates are selected 99% of the time, the system may adjust the default criteria model to weigh those components more than other factors, although not limited thereto.

The offers 502 may be presented in ranked order showing the most favorable choice on top. The offers 502 can be ranked and sorted by the seller's score or the default score using a sorting icon 510. In some embodiments, the scores may be presented in a graphical format such as using a bar graph or line graph (e.g., including data points for each of criteria). In some embodiments, the system can create an Offer Summary Report document (e.g., in pdf format) summarizing each of the offers and including the information from the Offer Scoreboard and/or Offer Details. The listing agent may initiate the generation of the report by clicking an icon 318 in the display, and download or send the report via the system.

As shown in FIG. 5, the criteria module 410 may also be presented on the Offer Scorecard, permanently or as a temporary pop-up. Thus, the listing agent or seller can adjust the criteria and see the scores change in real time. As one or more of the sliders are moved, e.g., from 20% weight to 80% weight, the scoring for the various offers dynamically change in the user interface 500. In the case of a graphical display, the bar or line graphs will dynamically change as the criteria selections are changed.

Figure 6:
FIG. 6 is an electronic communication generated by the system according to the present teachings.

FIG. 6 illustrates an invite communication 600 generated by the system and sent to a buyer's agent. Upon being invited to an Offer Board by a listing agent (via icon 209), the buyer's agent receives the message (e.g., email) including a hyperlink 602 to the Offer Board. The link 602 is unique to the particular buyer's agent (e.g., unique URL including identifying information or code) such that, by clicking on the link 602, the buyer's agent is presented with the custom user interface 700 without having to enter any log-in credentials. As shown in FIG. 7, the buyer's agent may view statistics 706 on the listing, including the number of offers to date, the brokerages from which the offers originated, and the most recent bid.

The user interface 700 further presents the buyer's agent with a fillable form 720 to send an offer to the listing agent. Upon entering the offer information, the system transmits the offer to the listing agent and generates a notification to the listing agent and/or seller that an offer has been received. The statistics 706 are also updated upon the offer being sent and viewable by other buyer's agents who have been invited to the Offer Board.

As shown in FIG. 8, the buyer's agent may receive dynamic feedback while entering the offer details. The feedback may be generated based on default scoring information and/or statistics generated by the system from historical and/or real time information about other real estate transactions. For example, while the buyer's agent enters an offer amount, a window 730 may inform the buyer's agent how an increase in the offer may increase the chances of it being accepted based on historical data (e.g., nationally or specific the geographical area or neighborhood). In some embodiments, the system may present information 732 specific to the seller's preferences, such as a desired close date.

Buyer's agents who receive low offer scores may do any number of things:
1. They could drop out of the multiple offer process.
2. They could stand pat with their current offer.
3. They could improve their offer by making changes to specific components of their offer.

In one embodiment, the scores are relative to each other, although not limited thereto. Accordingly, if a buyer's agent decides to improve their offer, each score presented to the listing agent or seller (see FIGS. 4-5) may be recalculated. As the deadline approaches (e.g., may be set up by listing agent), the recalculation may happen as each new offer is submitted by new or existing buyer's agents. Ultimately, the deadline arrives and the listing agent discusses the offers with the seller and the seller chooses their next course of action (e.g., accept, counter, etc.).

A relative or "relativity score" may be calculated and sent to the buyers' agents, or displayed on each buyer's agent's user interface (e.g., in the statistics window 706), once there are at least two offers in the system. As offers change and are entered by buyers, the score for the listing agent may be calculated and one offer gets the highest score (e.g., scored a "1"). All the other scores may be graded relative to that highest score by dividing each offer score by the highest offer score. This allows offers to be ranked according to seller preferences. The highest offer score may change as more offers come in and thus all buyer scores may be adjusted when a higher score is calculated from a new or modified offer.

Notifications may be preferable for agents because they may drive a buyer's agent towards improving their offer if their score is low. Scores may also demonstrate to sellers that agents are using intelligent tools to assist them in getting the best possible deal for their listing/property.

While the present teachings have been described above in terms of specific embodiments, it is to be understood that they are not limited to these disclosed embodiments. Many modifications and other embodiments will come to mind to those skilled in the art to which this pertains, and which are intended to be covered by this disclosure. It is intended that the scope of the present teachings should be determined by proper interpretation and construction of this disclosure and its legal equivalents, as understood by those of skill in the art relying upon the disclosure in this specification and the attached drawings.

What is claimed is:

1. A real estate offer management system, comprising:
a central computer executing software to receive two or more offers for a real estate listing from potential buyers, the two or more offers each having components including offer price and one or more of cash down, deposit, mortgage amount, closing date, and contingencies;
software executing on said central computer receiving data indicative of a seller's criteria in a web-based user interface, the seller's criteria assigning relative weights to the components of the two or more offers;
a database storing the seller's criteria;
wherein said software receiving the two or more offers generates and transmits a unique link to each of a plurality of buyer representatives, wherein upon receipt and execution of the unique link each of the buyer representatives is presented with a portal to submit an offer without logging in, wherein the portal includes a fillable form for receiving the offer, wherein the portal displays real-time feedback to the buyer representative as the offer is entered into the fillable form, wherein the real-time feedback is based on a seller's preferences related to the components of the two or more offers;
software executing on said central computer generating a first score for each of the two or more offers based on the seller's criteria;
software executing on said central computer presenting the two or more offers and the first scores to a listing agent or seller via the web-based user interface;
software executing on said central computer receiving data indicative of criteria of offers and accepted offers and generating or modifying a default criteria;
software executing on said central computer generating a default score for each of the two or more offers based on the default criteria;
wherein the seller dynamically changes the seller's criteria into a modified seller's criteria by adjusting the relative weights of the components, the software executing on said central computer dynamically generates a second score for each of the two or more offers based on the modified seller's criteria, and the two or more offers and the second scores are dynamically presented in the web-based user interface; and
wherein said software present the seller's second score further presents the default scores via the web-based user interface.

2. The system according to claim 1, wherein the seller's preferences related to the components of the two or more offers comprises a desired closing date.

3. The system according to claim 1, wherein the real time feedback is further based on historical data of offers and accepted offers in a geographical area associated with the real estate listing.

4. The system according to claim 1, wherein the portal displays statistics associated with the real estate listing, including a number of offers received and a date of a last offer.

5. The system according to claim 4, further comprising:
software executing on said central computer generating a relative score for each of the two or more offers by dividing the second score for each of the offers by the score of the offer with the highest score;
wherein the relative score of the offer entered by the buyer representative is displayed in the portal.

6. The system according to claim 1, further comprising:
software executing on said central computer generating a relative score for each of the two or more offers by dividing the second score for each of the offers by the score of the offer with the highest score;
wherein the software presenting the two or more offers and the second scores to a listing agent or seller via the web-based user interface further presents the relative scores.

7. The system according to claim 1, wherein the real time feedback is further based on the default criteria.

8. The system according to claim 1, wherein the web-based user interface includes a plurality of slideable icons to adjust the relative weights of the components of the two or more offers.

9. The system according to claim 1, wherein the web-based user interface includes a selectable icon to generate and export a summary report document including each of the two or more offers and the second scores.

10. A method of providing a real estate offer management system, comprising the steps of:
generating and transmitting, via software executing on a central computer, a unique link to each of a plurality of buyer representatives, wherein upon receipt and execution of the unique link each of the buyer representatives is presented with a portal to submit an offer without logging in;
receiving, via software executing on said central computer, two or more offers from potential buyers for a real estate listing;
receiving, via a criteria input module in a web-based user interface, data indicative of a seller's criteria, the seller's criteria assigning relative weights to components of two or more offers;
storing the seller's criteria including components of the two or more offers in the form of an offer price and two or more of cash down, deposit, mortgage amount, closing date, and contingencies in a database;
generating, via software executing on said central computer, a first score for each of the two or more offers based on the seller's criteria;
presenting the two or more offers and the first scores to a listing agent or seller via the web-based user interface;
changing the seller's criteria into a modified seller's criteria in response to the seller dynamically adjusting the relative weights of the components using the criteria input module;
dynamically generating, via the software executing on said central computer, a second score for each of the two or more offers dynamically based on the modified seller's criteria; and
granting, via software executing on said central computer, a relative score for each of the two or more offers by dividing the first score or the second score for each of the offers by the respective first score or second score of the offer with the highest score;
presenting the two or more offers and the second scores dynamically to a listing agent or seller via the web-based user interface;
wherein the presentation of the two or more offers and the first scores and second scores to a listing agent or seller via the web-based user interface further includes the relative scores;
wherein presentation of the two or more offers and the scores in the web-based user interface dynamically change as the seller dynamically adjusts the relative weight of the components of the seller's criteria into the modified seller's criteria; and
wherein the portal includes a fillable form for receiving the offer and displays real-time feedback to the buyer representative as the offer is entered into the fillable form, wherein the real-time feedback is based on a seller's preferences related to the components of the two or more offers.

11. The method according to claim 10, further comprising the steps of:
receiving, via software executing on said central computer, data indicative of criteria of offers and accepted offers;
generating or modifying a default criteria based on the data indicative of criteria of offers and accepted offers;
generating, via software executing on said central computer, a default score for each of the two or more offers based on the default criteria, wherein the presentation of the two or more offers and the first scores or second scores to a listing agent or seller via the web-based user interface further includes the default score.

12. The method according to claim 10, wherein the real time feedback is further based on historical data of offers and accepted offers in a geographical area associated with the real estate listing.

13. A method of providing a real estate offer management system, comprising the steps of:
generating and transmitting, via software executing on a central computer, a unique link to each of a plurality of buyer representatives, wherein upon receipt and execution of the unique link each of the buyer representatives is presented with a portal to submit an offer without logging in;
receiving, via software executing on said central computer, two or more offers from potential buyers for a real estate listing;
receiving, via a criteria input module in a web-based user interface, data indicative of a seller's criteria, the seller's criteria assigning relative weights to components of two or more offers;
storing the seller's criteria including components of the two or more offers in the form of an offer price and two or more of cash down, deposit, mortgage amount, closing date, and contingencies in a database;
generating, via software executing on said central computer, a first score for each of the two or more offers based on the seller's criteria;
presenting the two or more offers and the first scores to a listing agent or seller via the web-based user interface;

changing the seller's criteria into a modified seller's criteria in response to the seller dynamically adjusting the relative weights of the components using the criteria input module;

dynamically generating, via the software executing on said central computer, a second score for each of the two or more offers dynamically based on the modified seller's criteria;

presenting the two or more offers and the second scores dynamically to a listing agent or seller via the web-based user interface;

wherein presentation of the two or more offers and the scores in the web-based user interface dynamically change as the seller dynamically adjusts the relative weight of the components of the seller's criteria into the modified seller's criteria; and wherein the portal includes a fillable form for receiving the offer and displays real-time feedback to the buyer representative as the offer is entered into the fillable form, wherein the real-time feedback is based on a seller's preferences related to the components of the two or more offers, and wherein the real time feedback is based on historical data of offers and accepted offers in a geographical area associated with the real estate listing.

14. The method according to claim 13, wherein the seller's preferences related to the components of the two or more offers comprises a desired closing date.

15. The method according to claim 13, wherein the portal displays statistics associated with the real estate listing, including a number of offers received and a date of a last offer.

16. The method according to claim 13, wherein the web-based user interface includes a plurality of slideable icons to adjust the relative weights of the components of the two or more offers.

17. The method according to claim 13, wherein the web-based user interface includes a selectable icon to generate and export a summary report document including each of the two or more offers and the second scores.

18. The method according to claim 13, further comprising the steps of:

generating, via software executing on said central computer, a relative score for each of the two or more offers by dividing the first score or the second score for each of the offers by the respective first score or second score of the offer with the highest score;

wherein the presentation of the two or more offers and the first scores and second scores to a listing agent or seller via the web-based user interface further includes the relative scores.

19. The method according to claim 18, further comprising the steps of:

receiving, via software executing on said central computer, data indicative of criteria of offers and accepted offers;

generating or modifying a default criteria based on the data indicative of criteria of offers and accepted offers;

generating, via software executing on said central computer, a default score for each of the two or more offers based on the default criteria, wherein the presentation of the two or more offers and the first scores or second scores to a listing agent or seller via the web-based user interface further includes the default score.

* * * * *

UNITED STATES PATENT AND TRADEMARK OFFICE
CERTIFICATE OF CORRECTION

PATENT NO. : 10,997,643 B2
APPLICATION NO. : 14/847948
DATED : May 4, 2021
INVENTOR(S) : Alex Perriello and John Canniffe Page 1 of 1

It is certified that error appears in the above-identified patent and that said Letters Patent is hereby corrected as shown below:

In the Claims

Claim 10: Column 11, Line 67, remove the word "and" after the word "criteria".

Claim 10: Column 12, Line 1, granting should be changed to --generating-- before the word "via".

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*